(12) United States Patent
Maruyama

(10) Patent No.: US 10,855,193 B2
(45) Date of Patent: Dec. 1, 2020

(54) VEHICLE POWER SUPPLY DEVICE

(71) Applicant: Yazaki Corporation, Tokyo (JP)

(72) Inventor: Akinori Maruyama, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/566,856

(22) Filed: Sep. 10, 2019

(65) Prior Publication Data
US 2020/0091830 A1 Mar. 19, 2020

(30) Foreign Application Priority Data
Sep. 13, 2018 (JP) .................. 2018-171466

(51) Int. Cl.
*H02M 5/40* (2006.01)
*B60L 58/19* (2019.01)
*H02J 7/00* (2006.01)
*H02M 7/66* (2006.01)

(52) U.S. Cl.
CPC .............. *H02M 5/40* (2013.01); *B60L 58/19* (2019.02); *H02J 7/0024* (2013.01); *H02M 7/66* (2013.01); *H02J 2207/20* (2020.01)

(58) Field of Classification Search
CPC ........ H02M 7/66; H02M 7/757; H02M 7/758; H02M 5/40; H02J 3/36; H02J 7/00; H02J 7/0024; H02J 2207/20; H02J 5/00; B60L 53/22; B60L 53/20; B60L 50/60; B60L 1/00; B60L 58/00; B60L 53/00; B60L 58/19
See application file for complete search history.

(56) References Cited

U.S. PATENT DOCUMENTS

| 5,633,577 | A | * | 5/1997 | Matsumae | ............ | H02J 7/0013 |
| | | | | | | 322/37 |
| 8,963,482 | B2 | | 2/2015 | Ang et al. | | |
| 10,763,754 | B2 | | 9/2020 | Oouchi et al. | | |
| 2009/0103341 | A1 | * | 4/2009 | Lee | ........................ | B60W 10/26 |
| | | | | | | 363/124 |
| 2010/0080030 | A1 | * | 4/2010 | Wiegman | ............ | H02M 5/4585 |
| | | | | | | 363/131 |
| 2010/0096921 | A1 | * | 4/2010 | Ishida | ..................... | B60L 58/20 |
| | | | | | | 307/9.1 |
| 2010/0097031 | A1 | * | 4/2010 | King | ..................... | H02M 3/155 |
| | | | | | | 320/109 |

(Continued)

FOREIGN PATENT DOCUMENTS

| JP | 2016-127608 A | 7/2016 |
| JP | 2017-41999 A | 2/2017 |
| WO | 2012/081103 A1 | 6/2012 |

*Primary Examiner* — Gustavo A Rosario-Benitez
(74) *Attorney, Agent, or Firm* — Kenealy Vaidya LLP

(57) ABSTRACT

A power conversion unit includes an AC/DC converter converting alternating-current power supplied from an AC power supply into direct-current power to charge a high-voltage battery with the direct-current power and a step-down DC/DC converter generating an intermediate voltage provided by stepping down a voltage of direct-current power supplied from the high-voltage battery. A constant-voltage DC/DC converter outputs, to a low-voltage load unit, direct-current power provided by stepping down the intermediate voltage of direct-current power output from the step-down DC/DC converter at a constant step-down ratio.

8 Claims, 7 Drawing Sheets

(56) References Cited

U.S. PATENT DOCUMENTS

| | | | |
|---|---|---|---|
| 2012/0068663 A1* | 3/2012 | Tanikawa | B60L 53/14 320/109 |
| 2012/0235626 A1 | 9/2012 | Oh et al. | |
| 2013/0221921 A1* | 8/2013 | Ang | B60L 15/007 320/109 |
| 2013/0257375 A1 | 10/2013 | Ang et al. | |
| 2013/0313903 A1* | 11/2013 | Kayama | H02J 1/00 307/26 |
| 2014/0028256 A1* | 1/2014 | Sugiyama | B60L 1/006 320/109 |
| 2015/0042159 A1* | 2/2015 | Kim | B60L 53/20 307/10.1 |
| 2017/0070155 A1* | 3/2017 | Takahara | H02M 3/33569 |
| 2017/0113567 A1* | 4/2017 | Koketsu | H02M 1/36 |
| 2017/0358987 A1 | 12/2017 | Oouchi et al. | |
| 2018/0287408 A1* | 10/2018 | Kutkut | H02J 9/061 |
| 2019/0329663 A1* | 10/2019 | Kominami | H02M 3/33523 |

* cited by examiner

VEHICLE POWER SUPPLY DEVICE

CROSS-REFERENCE TO RELATED APPLICATION(S)

The present application claims priority to and incorporates by reference the entire contents of Japanese Patent Application No. 2018-171466 filed in Japan on Sep. 13, 2018.

BACKGROUND OF THE INVENTION

1. Field of the Invention

The present invention relates to a vehicle power supply device.

2. Description of the Related Art

Japanese Patent Application Laid-open No. 2017-41999 discloses, as a conventional vehicle power supply device, for example, a vehicle power supply system including a traveling battery, a standard battery having a lower voltage than that of the traveling battery, and a step-down converter stepping down a voltage of electric power supplied from the traveling battery and outputting it to the standard battery.

However, in the above-mentioned vehicle power supply system disclosed in Japanese Patent Application Laid-open No. 2017-41999, for example, the number of step-down converters increases and the device tends to increase in size, and there is room for further improvement in this point.

SUMMARY OF THE INVENTION

The present invention has been made in view of the above-mentioned circumstances and an object thereof is to provide a vehicle power supply device capable of substantially preventing the device from being increased in size.

In order to achieve the above mentioned object, a vehicle power supply device according to one aspect of the present invention includes a battery that supplies direct-current power to a high-voltage load unit and a low-voltage load unit having a lower voltage than a voltage of the high-voltage load unit; a power supply connector that is connected to an alternating-current power supply unit supplying alternating-current power to the battery; a power converter that includes an AC/DC converter converting alternating-current power supplied from the alternating-current power supply unit into direct-current power to charge the battery with the direct-current power and a step-down DC/DC converter generating an intermediate voltage provided by stepping down a voltage of the direct-current power supplied from the battery; a constant-voltage DC/DC converter that outputs, to the low-voltage load unit, direct-current power provided by stepping down the intermediate voltage generated by the step-down DC/DC converter; a switching unit that turns ON or OFF electric connection between the AC/DC converter and the power supply connector and turns ON or OFF electric connection between the step-down DC/DC converter and the constant-voltage DC/DC converter; a detector that detects start of supply of the alternating-current power supplied from the alternating-current power supply unit; and a controller that controls the switching unit based on a detection result obtained by the detector, wherein when the detector detects the start of the supply of the alternating-current power, the controller turns ON the connection between the AC/DC converter and the power supply connector to charge the battery with the direct-current power converted by the AC/DC converter and turns OFF the connection between the step-down DC/DC converter and the constant-voltage DC/DC converter to stop direct-current power output to the constant-voltage DC/DC converter from the step-down DC/DC converter; when the detector does not detect the start of the supply of the alternating-current power, the controller turns ON the connection between the step-down DC/DC converter and the constant-voltage DC/DC converter to output, to the low-voltage load unit, direct-current power stepped down by the step-down DC/DC converter and the constant-voltage DC/DC converter, is capable of supplying the direct-current power to the high-voltage load unit from the battery without passing through the step-down DC/DC converter, and turns OFF the connection between the AC/DC converter and the power supply connector so as not to charge the battery with the direct-current power from the AC/DC converter, and the constant-voltage DC/DC converter outputs, to the low-voltage load unit, direct-current power provided by stepping down the intermediate voltage of direct-current power output from the step-down DC/DC converter at a constant step-down ratio.

According to another aspect of the present invention, in the vehicle power supply device, it is possible to configure that the AC/DC converter includes a rectifying circuit rectifying the alternating-current power supplied from the alternating-current power supply unit into direct-current power and a bidirectional DC/DC converter boosting a voltage of the direct-current power rectified by the rectifying circuit, and the step-down DC/DC converter generates the intermediate voltage provided by stepping down the voltage of the direct-current power supplied from the battery using the bidirectional DC/DC converter.

According to still another aspect of the present invention, in the vehicle power supply device, it is possible to configure that the constant-voltage DC/DC converter includes a step-down chopper circuit having a switching element allowing conduction of a current or blocking the current and a coil outputting an induction current in accordance with an operation of the switching element.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A mode for carrying out the present invention (embodiment) will be described in detail with reference to the drawings. Contents that are described in the following embodiment do not limit the present invention. Components to be described below include components that those skilled in the art can easily suppose and that are substantially the same components. Furthermore, configurations to be described below can be appropriately combined. Various omissions, replacements, or changes of the configurations can be made in a range without departing from the gist of the present invention.

Embodiment

Figure 1:
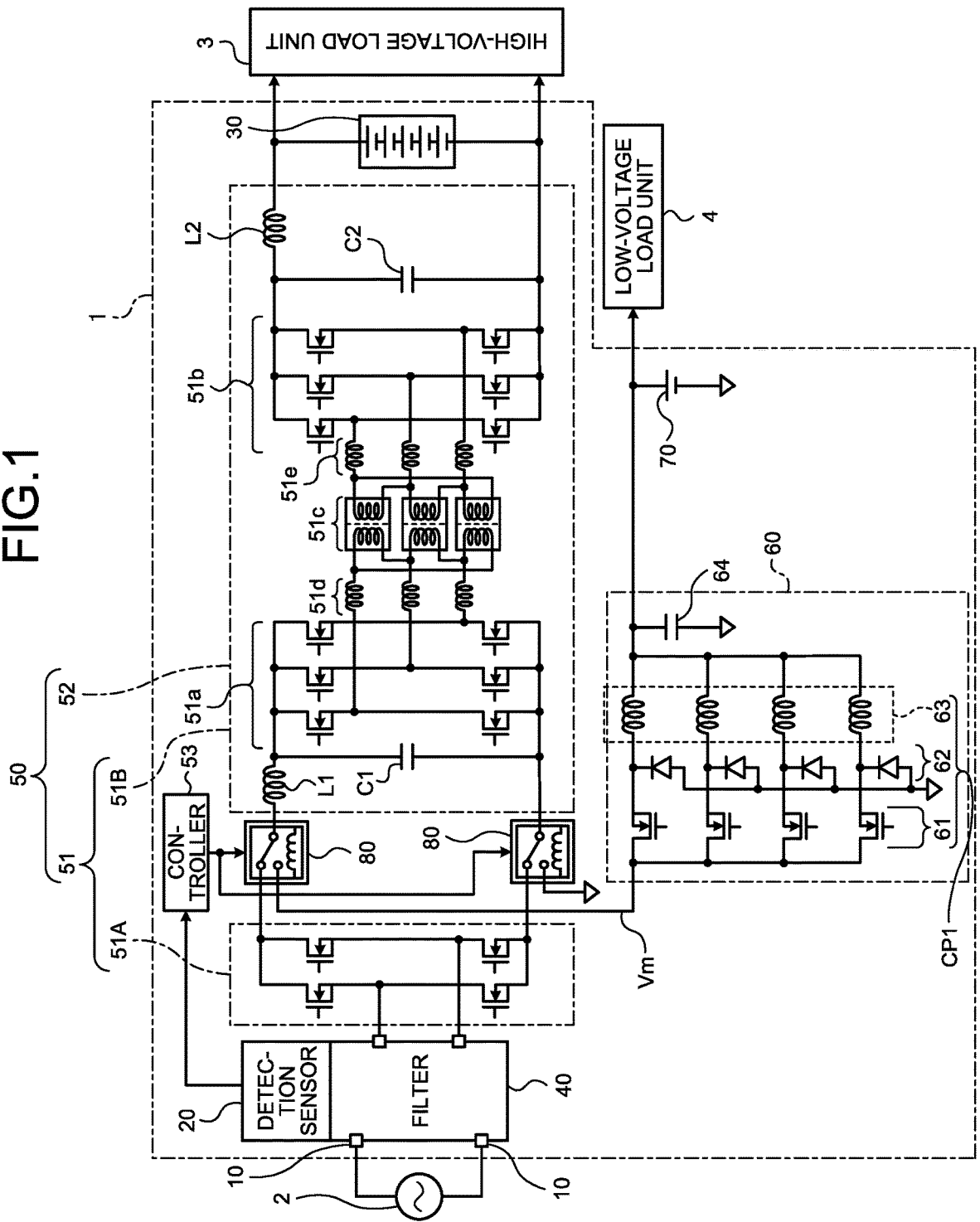
FIG. 1 is a block diagram illustrating an example of the configuration of a vehicle power supply device according to an embodiment.
Figure 2:
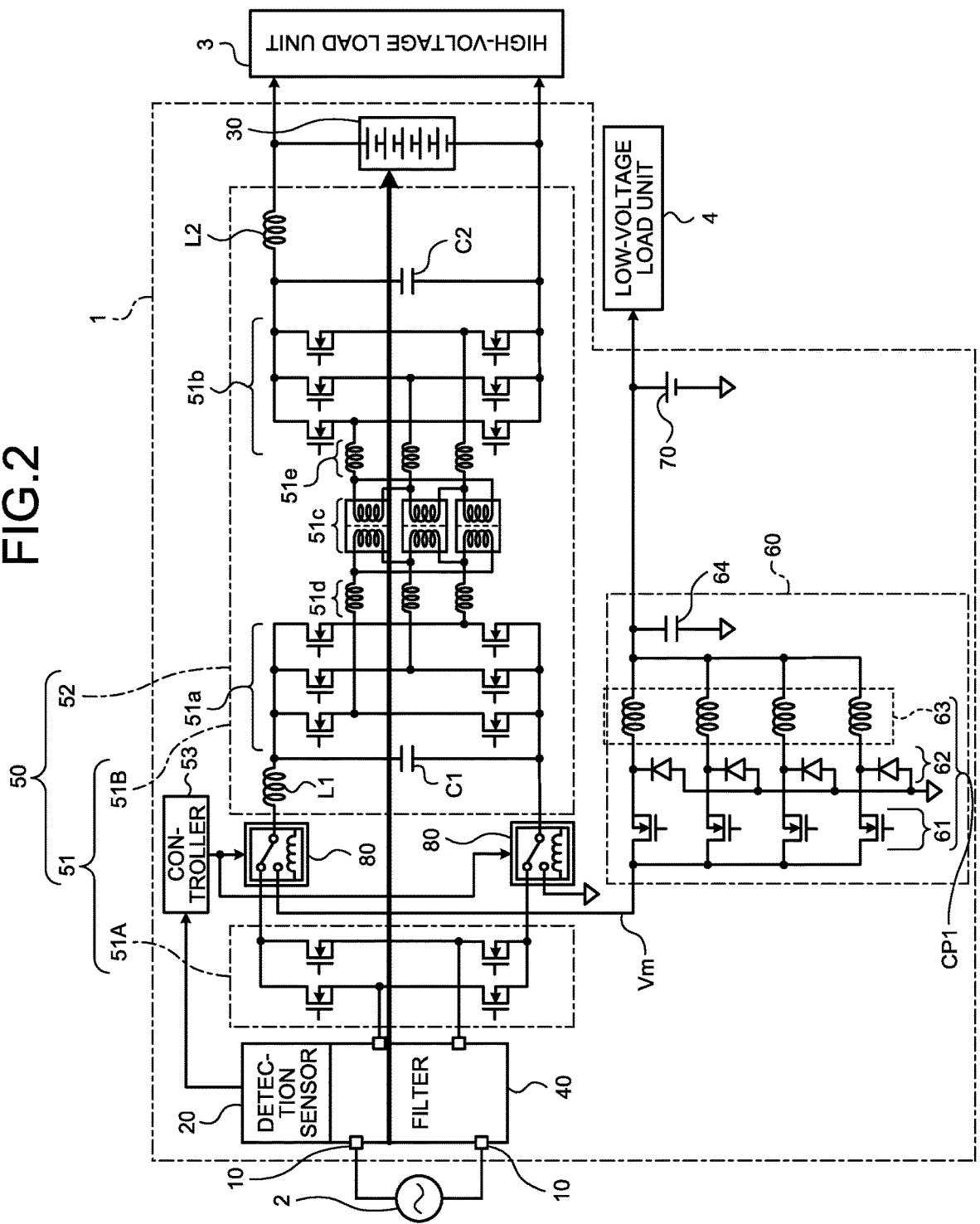
FIG. 2 is a block diagram illustrating an example of charging of the vehicle power supply device in the embodiment.
Figure 3:
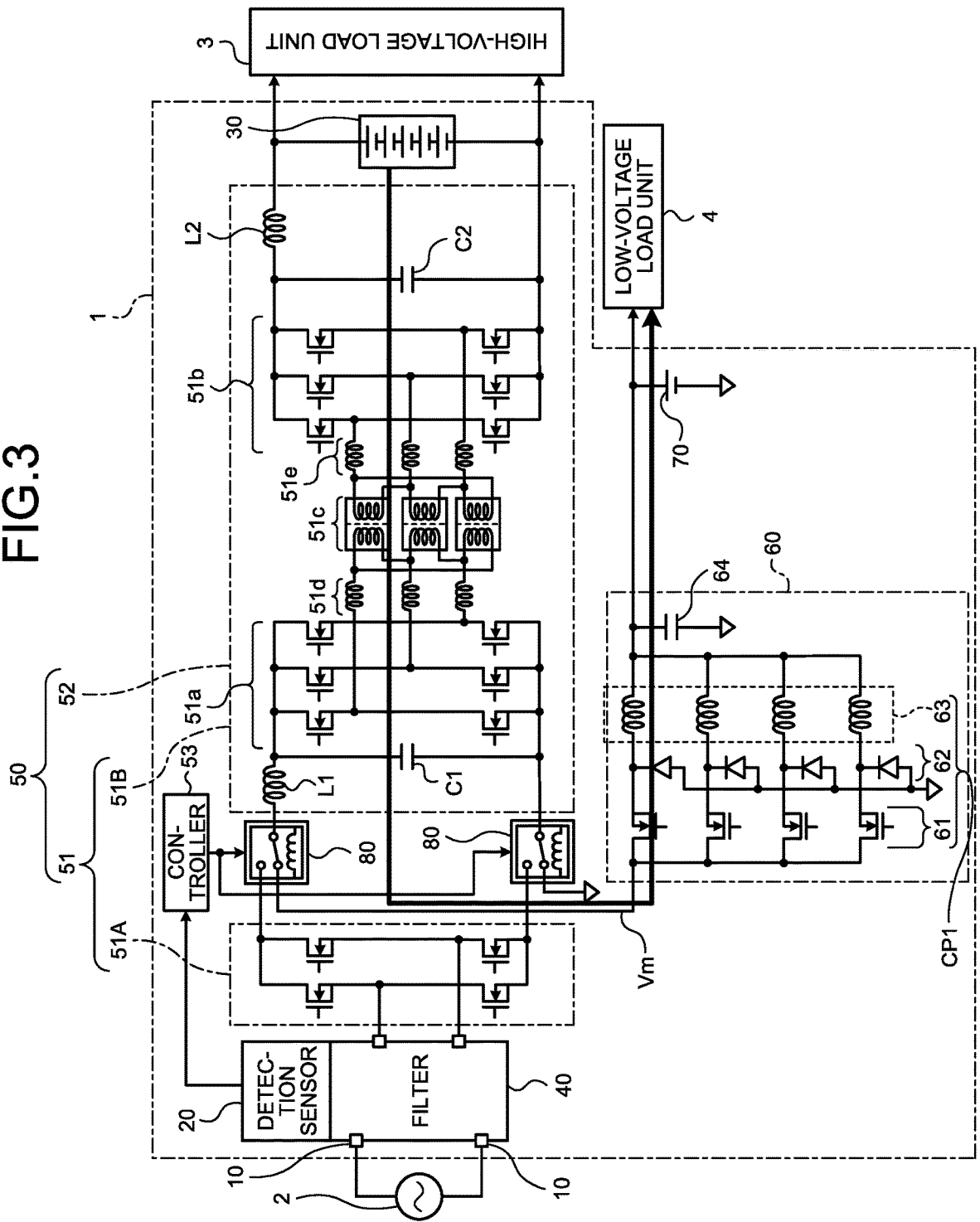
FIG. 3 is a block diagram illustrating an example of discharging of the vehicle power supply device in the embodiment.

A vehicle power supply device 1 according to an embodiment will be described with reference to the drawings. FIG. 1 is a block diagram illustrating an example of the configuration of the vehicle power supply device 1 in the embodiment. FIG. 2 is a block diagram illustrating an example of charging of the vehicle power supply device 1 in the embodiment. FIG. 3 is a block diagram illustrating an example of discharging of the vehicle power supply device 1 in the embodiment.

The vehicle power supply device 1 is mounted on, for example, a vehicle such as an electric vehicle (EV) and a plug-in hybrid vehicle (PHV) and supplies electric power to a high-voltage load unit 3 including an inverter and a motor generator and a low-voltage load unit 4 including an auxiliary load unit that has a lower voltage than that of the high-voltage load unit 3. The auxiliary load unit is, for example, a vehicle system activation unit, a wiper, a headlight, or an audio device.

As illustrated in FIG. 1, the vehicle power supply device 1 includes an AC inlet 10 as a power supply connector, a detection sensor 20 as a detector, a high-voltage battery 30 as a battery, a filter 40, a power conversion unit 50 as a power converter, a constant-voltage DC/DC converter 60, an auxiliary battery 70, and a changeover switch 80 as a switching unit.

The AC inlet 10 is a connector that is connected to an AC outlet of an AC power supply (alternating-current power supply unit) 2 for domestic use. A part of the AC inlet 10 is exposed to the outside of the vehicle. The AC inlet 10 is connected to the AC outlet for domestic use and alternating-current power is output thereto from the AC power supply 2.

The detection sensor 20 detects start of supply of the alternating-current power. The detection sensor 20 detects the start of the supply of the alternating-current power supplied through the AC outlet, for example. The detection sensor 20 detects, for example, connection of the AC outlet to the AC inlet 10, as the start of the supply of the alternating-current power. The detection sensor 20 detects electric or mechanical connection of the AC outlet and the AC inlet 10. The detection sensor 20 is connected to a controller 53, which will be described later, and outputs a detection result to the controller 53.

The high-voltage battery 30 supplies high-voltage direct-current power. The high-voltage battery 30 has a voltage of, for example, 400 V, 800 V, or 1000 V and supplies relatively high-voltage direct-current power. The high-voltage battery 30 is connected to the low-voltage load unit 4 with the power conversion unit 50 and the constant-voltage DC/DC converter 60 interposed therebetween and supplies the direct-current power to the low-voltage load unit 4. The high-voltage battery 30 is connected to the high-voltage load unit 3 and supplies the direct-current power to the high-voltage load unit 3. An inverter of the high-voltage load unit 3 converts the direct-current power supplied from the high-voltage battery 30 into alternating-current power and supplies the alternating-current power to a motor generator. The motor generator is driven with the alternating-current power supplied from the inverter to rotate a wheel of the vehicle.

The filter 40 reduces noise. The filter 40 is connected to the AC inlet 10 and reduces noise of the alternating-current power output from the AC inlet 10. The filter 40 is connected to the power conversion unit 50 and outputs the alternating-current power with the reduced noise to the power conversion unit 50.

The power conversion unit 50 converts electric power. The power conversion unit 50 includes an AC/DC converter 51 and a step-down DC/DC converter 52. The AC/DC converter 51 converts alternating-current power into direct-current power. The AC/DC converter 51, for example, converts the alternating-current power supplied from the alternating-current power supply 2 into direct-current power and charges the high-voltage battery 30 with the direct-current power, as illustrated in FIG. 2. The AC/DC converter 51 includes a rectifying circuit 51A and a bidirectional DC/DC converter 51B. The rectifying circuit 51A rectifies alternating-current power into direct-current power. The rectifying circuit 51A is, for example, a full-bridge circuit having four switching elements. The rectifying circuit 51A is connected to the filter 40 and rectifies the alternating-current power output from the filter 40 into direct-current power. The rectifying circuit 51A is connected to the bidirectional DC/DC converter 51B and outputs the rectified direct-current power to the bidirectional DC/DC converter 51B.

The bidirectional DC/DC converter 51B boosts or steps down a voltage. The bidirectional DC/DC converter 51B is, for example, a one-converter circuit using a three-phase dual active bridge (DAB). The bidirectional DC/DC converter 51B includes a first bridge circuit 51a, a second bridge circuit 51b, a transformer 51c, capacitors C1 and C2, coil portions 51d and 51e, and coils L1 and L2.

The first bridge circuit 51a is a three-phase full-bridge circuit having six switching elements. The first bridge circuit 51a is connected to the rectifying circuit 51A with the changeover switch 80 interposed therebetween and is connected to the transformer 51c. The first bridge circuit 51a converts the direct-current power output from the rectifying circuit 51A into alternating-current power and outputs the alternating-current power to the transformer 51c. The first bridge circuit 51a is connected to the constant-voltage DC/DC converter 60 with the changeover switch 80 interposed therebetween, converts alternating-current power output from the transformer 51c into direct-current power, and outputs the direct-current power to the constant-voltage DC/DC converter 60 through the changeover switch 80.

The second bridge circuit 51b is a three-phase full-bridge circuit having six switching elements. The second bridge circuit 51b is connected to the transformer 51c and the high-voltage battery 30. The second bridge circuit 51b converts alternating-current power output from the transformer 51c into direct-current power and outputs the direct-current power to the high-voltage battery 30. The second bridge circuit 51b converts direct-current power output from the high-voltage battery 30 into alternating-current power and outputs the alternating-current power to the transformer 51c.

The transformer 51c includes a primary winding portion having three coils and a secondary winding portion having three coils and being magnetically coupled to the primary winding portion. The primary winding portion and the secondary winding portion are insulated from each other. The transformer 51c can thereby insulate a high-voltage power supply system for traveling including the high-voltage load unit 3 such as the motor generator and the high-voltage battery 30 and a low-voltage power supply system including the low-voltage load unit 4 such as the auxiliary load unit. The transformer 51c can further insulate the high-voltage power supply system for traveling and the AC inlet 10. Thus, the vehicle power supply device 1 connects the high-voltage power supply system for traveling and the low-voltage power supply system and the like with the power conversion unit 50 interposed therebetween, so that the high-voltage power supply system for traveling can be easily isolated, thereby improving maintainability.

The primary winding portion of the transformer 51c is connected to the first bridge circuit 51a with the coil portion 51d interposed therebetween. The secondary winding portion of the transformer 51c is connected to the second bridge circuit 51b with the coil portion 51e interposed therebetween. The transformer 51c converts a voltage by electromagnetic induction of the primary winding portion and the secondary winding portion. The transformer 51c boosts a voltage of electric power supplied from the AC power supply 2 and steps down a voltage of electric power supplied from the high-voltage battery 30.

The capacitor C1 is provided between the first bridge circuit 51a and the changeover switch 80 and smoothes the direct-current power that is output from the first bridge circuit 51a to the constant-voltage DC/DC converter 60 through the changeover switch 80. The capacitor C2 is provided between the second bridge circuit 51b and the high-voltage battery 30 and smoothes the direct-current power that is output from the second bridge circuit 51b to the high-voltage battery 30. The first bridge circuit 51a and the changeover switch 80 are connected to each other with the coil L1 interposed therebetween, and the second bridge circuit 51b and the high-voltage battery 30 are connected to each other with the coil L2 interposed therebetween.

The step-down DC/DC converter 52 steps down a voltage of direct-current power. The step-down DC/DC converter 52 generates an intermediate voltage Vm provided by stepping down a voltage of the direct-current power supplied from the high-voltage battery 30. The intermediate voltage Vm is previously determined in accordance with the number of phases of the constant-voltage DC/DC converter 60. The intermediate voltage Vm is, for example, determined in a range of a value calculated by multiplying a minimum value of a voltage of the low-voltage load unit 4 by the number of phases to a value calculated by multiplying a maximum value of the voltage of the low-voltage load unit 4 by the number of phases. When, for example, the maximum value of the voltage of the low-voltage load unit 4 is 15 V and the number of phases is four, a maximum value of the intermediate voltage Vm is 60 V. The step-down DC/DC converter 52 generates the intermediate voltage Vm provided by stepping down the voltage of the direct-current power supplied from the high-voltage battery 30 using, for example, the bidirectional DC/DC converter 51B. That is to say, the step-down DC/DC converter 52 generates the intermediate voltage Vm while serving also as the bidirectional DC/DC converter 51B, which is used in charging of the high-voltage battery 30.

The step-down DC/DC converter 52, for example, generates the intermediate voltage Vm provided by stepping down, using the transformer 51c, the voltage of the direct-current power supplied from the high-voltage battery 30 and outputs direct-current power of the intermediate voltage Vm to the constant-voltage DC/DC converter 60 through the changeover switch 80, as illustrated in FIG. 3.

The constant-voltage DC/DC converter 60 steps down a voltage of direct-current power. The constant-voltage DC/DC converter 60 includes a four-phase step-down chopper circuit CP1 and a smoothing capacitor 64. The step-down chopper circuit CP1 includes four switching elements 61 allowing conduction of a current or blocking the current, four diodes 62, and a coupling inductor 63 formed by four coils outputting induction currents through the diodes 62 in accordance with operations of the switching elements 61. The constant-voltage DC/DC converter 60 is connected to the step-down DC/DC converter 52 with the changeover switch 80 interposed therebetween and outputs, for example, to the low-voltage load unit 4, direct-current power provided by stepping down the intermediate voltage Vm generated by the step-down DC/DC converter 52. The constant-voltage DC/DC converter 60 outputs, for example, to the low-voltage load unit 4, direct-current power provided by stepping down the intermediate voltage Vm of the direct-current power output from the step-down DC/DC converter 52 at a constant step-down ratio, for example. The constant-voltage DC/DC converter 60 steps down the intermediate voltage Vm at a step-down ratio of one to the number of phases (1/number of phases). The constant-voltage DC/DC converter 60 steps down the intermediate voltage Vm at, for example, a step-down ratio of ¼ when it includes the four-phase step-down chopper circuit CP1. The four-phase step-down chopper circuit CP1, for example, steps down the intermediate voltage Vm of 60 V at the step-down ratio of ¼ to a voltage of 15 V. The smoothing capacitor 64 is connected to the step-down chopper circuit CP1 and smoothes direct-current power output from the step-down chopper circuit CP1. The smoothing capacitor 64 is connected to the auxiliary battery 70 and the low-voltage load unit 4 and outputs the smoothed direct-current power to the auxiliary battery 70 and the low-voltage load unit 4. It should be noted that switching elements can be used in synchronous rectification instead of the diodes 62.

The auxiliary battery 70 supplies electric power to the low-voltage load unit 4 including the auxiliary load unit 4. The auxiliary battery 70 is connected to the constant-voltage DC/DC converter 60 and is charged with the direct-current power output from the constant-voltage DC/DC converter 60. The auxiliary battery 70 is connected to the low-voltage load unit 4 and supplies the charged direct-current power to the low-voltage load unit 4.

The changeover switch 80 turns ON or OFF electric connection. As the changeover switch 80, for example, a mechanical relay or a semiconductor relay is employed. The changeover switch 80 turns ON or OFF electric connection between the AC inlet 10 and the AC/DC converter 51. The changeover switch 80 is provided between the rectifying circuit 51A and the bidirectional DC/DC converter 51B and turns ON or OFF electric connection between the rectifying circuit 51A and the bidirectional DC/DC converter 51B, for example. The changeover switch 80 is provided between the step-down DC/DC converter 52 and the constant-voltage DC/DC converter 60 and turns ON or OFF electric connection between the step-down DC/DC converter 52 and the constant-voltage DC/DC converter 60. The changeover switch 80 is switched into a first connection state of turning ON the electric connection between the rectifying circuit 51A and the bidirectional DC/DC converter 51B to enable the high-voltage battery 30 to be charged. The changeover switch 80 is switched into a second connection state of turning ON the electric connection between the step-down DC/DC converter 52 and the constant-voltage DC/DC converter 60 to enable the high-voltage battery 30 to supply electric power to the auxiliary battery 70 and the low-voltage load unit 4.

The power conversion unit 50 further includes the controller 53. The controller 53 controls the changeover switch 80. The controller 53 is connected to the detection sensor 20 and controls the changeover switch 80 based on a detection result obtained by the detection sensor 20.

The controller 53 switches the changeover switch 80 into the above-mentioned first connection state when the detection sensor 20 detects start of supply of alternating-current power. The controller 53 then turns ON the connection between the AC inlet 10 and the AC/DC converter 51 to charge the high-voltage battery 30 with the direct-current power converted by the AC/DC converter 51. Furthermore, the controller 53 turns OFF the connection between the step-down DC/DC converter 52 and the constant-voltage DC/DC converter 60 to stop direct-current power output to the constant-voltage DC/DC converter 60 from the step-down DC/DC converter 52.

On the other hand, the controller 53 switches the changeover switch 80 into the above-mentioned second connection state when the detection sensor 20 does not detect the start of the supply of the alternating-current power. The controller 53 turns ON the connection between the step-down DC/DC converter 52 and the constant-voltage DC/DC converter 60 to output, to the low-voltage load unit 4, the direct-current power stepped down by the step-down DC/DC converter 52 and the constant-voltage DC/DC converter 60. Furthermore, the controller 53 supplies the direct-current power to the high-voltage load unit 3 from the high-voltage battery 30 without passing through the step-down DC/DC converter 52. The controller 53 turns OFF the connection between the AC/DC converter 51 and the AC inlet 10 so as not to charge the high-voltage battery 30 with the direct-current power from the AC/DC converter 51.

Figure 4:
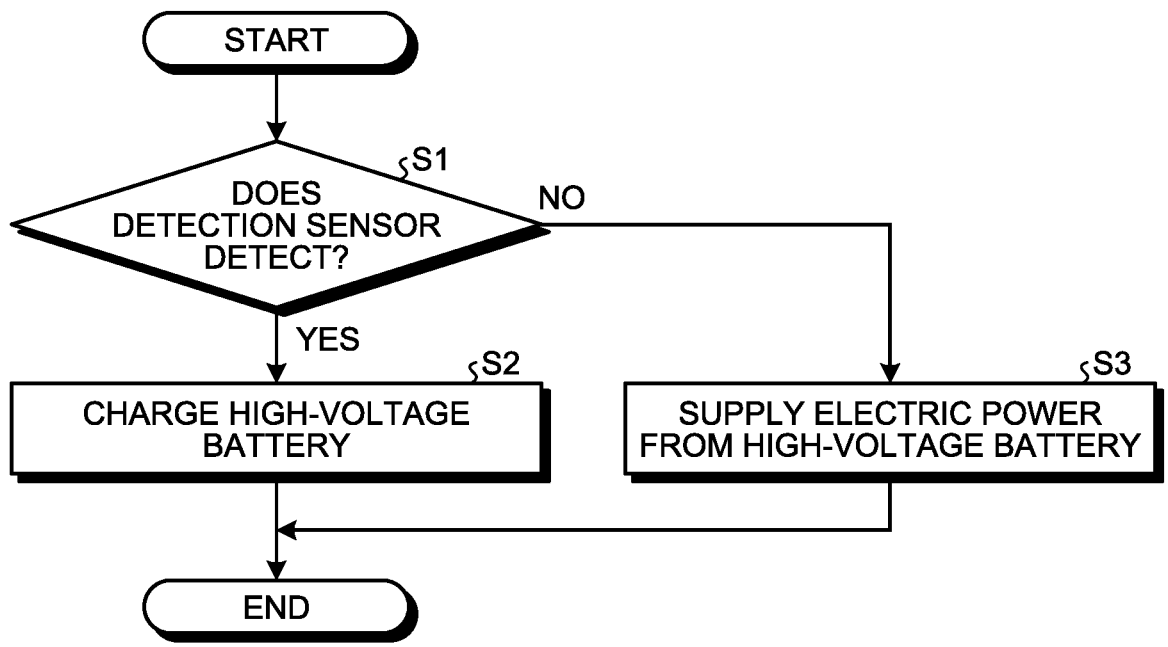
FIG. 4 is a flowchart illustrating an example of operations of the vehicle power supply device in the embodiment.

Next, an example of operations of the vehicle power supply device 1 will be described with reference to FIG. 4. FIG. 4 is a flowchart illustrating the example of the operations of the vehicle power supply device 1 in the embodiment. The vehicle power supply device 1 determines whether the detection sensor 20 detects the start of the supply of the alternating-current power (step S1). The detection sensor 20 detects, for example, connection of the AC outlet to the AC inlet 10, as the start of the supply of the alternating-current power. When the detection sensor 20 detects the start of the supply of the alternating-current power (Yes at step S1), the vehicle power supply device 1 charges the high-voltage battery 30 (step S2). The vehicle power supply device 1, for example, switches the changeover switch 80 into the first connection state to turn ON the connection between the AC inlet 10 and the AC/DC converter 51. The controller 53 then charges the high-voltage battery 30 with the direct-current power output from the AC inlet 10 and converted by the AC/DC converter 51, and the processing ends. The vehicle power supply device 1 switches the changeover switch 80 into the second connection state from the first connection state if necessary during the charging of the high-voltage battery 30. The vehicle power supply device 1 switches the changeover switch 80 into the second connection state from the first connection state when, for example, a charge ratio of the auxiliary battery 70 is lower than a predetermined reference value during the charging of the high-voltage battery 30. The vehicle power supply device 1 once stops charging of the high-voltage battery 30 and charges the auxiliary battery 70 with electric power supplied from the high-voltage battery 30. The vehicle power supply device 1 can thereby substantially prevent the charge ratio of the auxiliary battery 70 from being significantly lowered during the charging of the high-voltage battery 30.

When the detection sensor 20 does not detect the start of the supply of the alternating-current power at the above-mentioned step S1 (No at step S1), the vehicle power supply device 1 supplies electric power from the high-voltage battery 30 (step S3). The vehicle power supply device 1, for example, switches the changeover switch 80 into the second connection state to turn ON the connection between the step-down DC/DC converter 52 and the constant-voltage DC/DC converter 60 and output, to the low-voltage load unit 4 and the auxiliary battery 70, the direct-current power of the voltage stepped down by the step-down DC/DC converter 52 and the constant-voltage DC/DC converter 60. Furthermore, the controller 53 supplies the direct-current power to the high-voltage load unit 3 from the high-voltage battery 30 without passing through the step-down DC/DC converter 52, and the processing is finished.

As described above, the vehicle power supply device 1 in the embodiment includes the high-voltage battery 30, the AC inlet 10, the power conversion unit 50, the constant-voltage DC/DC converter 60, the changeover switch 80, the detection sensor 20, and the controller 53. The high-voltage battery 30 supplies the direct-current power to the high-voltage load unit 3 and the low-voltage load unit 4 having a lower voltage than that of the high-voltage load unit 3. The AC inlet 10 is connected to the AC power supply 2 supplying the alternating-current power to the high-voltage battery 30. The power conversion unit 50 includes the AC/DC converter 51 converting the alternating-current power supplied from the AC power supply 2 into the direct-current power to charge the high-voltage battery 30 with the direct-current power and the step-down DC/DC converter 52 generating the intermediate voltage Vm provided by stepping down the voltage of the direct-current power supplied from the high-voltage battery 30. The constant-voltage DC/DC converter 60 outputs, to the low-voltage load unit 4, the direct-current power provided by stepping down the intermediate voltage Vm generated by the step-down DC/DC converter 52. The changeover switch 80 turns ON or OFF the electric connection between the AC/DC converter 51 and the AC inlet 10 and turns ON or OFF the electric connection between the step-down DC/DC converter 52 and the constant-voltage DC/DC converter 60. The detection sensor 20 detects the start of the supply of the alternating-current power supplied from the AC power supply 2.

The controller 53 controls the changeover switch 80 based on the detection result obtained by the detection sensor 20. When the detection sensor 20 detects the start of the supply of the alternating-current power, the controller 53 turns ON the connection between the AC/DC converter unit 51 and the AC inlet 10 to charge the high-voltage battery 30 with the direct-current power converted by the power conversion unit 51. The controller 53 turns OFF the connection between the step-down DC/DC converter 52 and the constant-voltage DC/DC converter 60 to stop direct-current power output to the constant-voltage DC/DC converter 60 from the step-down DC/DC converter 52. On the other hand, when the detection sensor 20 does not detect the start of the supply of the alternating-current power, the controller 53 turns ON the connection between the step-down DC/DC converter 52 and the constant-voltage DC/DC converter 60 to output, to the low-voltage load unit 4, the direct-current power stepped down by the step-down DC/DC converter 52 and the constant-voltage DC/DC converter 60. Furthermore, the controller 53 supplies the direct-current power to the high-voltage load unit 3 from the high-voltage battery 30 without passing through the step-down DC/DC converter 52. The controller 53 turns OFF the connection between the AC/DC converter 51 and the AC inlet 10 so as not to charge the high-voltage battery 30 with the direct-current power from the AC/DC converter 51. The constant-voltage DC/DC converter 60 outputs, to the low-voltage load unit 4, the direct-current power provided by stepping down the intermediate voltage Vm of the direct-current power output from the step-down DC/DC converter 52 at the constant step-down ratio.

With this configuration, the vehicle power supply device 1 can convert the alternating-current power of the AC power supply 2 into the direct-current power using the power conversion unit 50 to charge the high-voltage battery 30 with it and step down the direct-current power of the high-voltage battery 30 to supply it to the low-voltage load unit 4. The vehicle power supply device 1 can thereby use the power conversion unit 50 as a boosting converter when charging the high-voltage battery 30 and a step-down converter when discharging the high-voltage battery 30. That is to say, the vehicle power supply device 1 can use the bidirectional DC/DC converter 51B of the power conversion unit 50 as the boosting converter in charging and the step-down converter in discharging. The vehicle power supply device 1 can thereby substantially prevent increase in the number of power converters, thereby substantially preventing the device from being increased in size. The vehicle power supply device 1 can reduce manufacturing cost. The vehicle power supply device 1 can decrease a creepage distance relatively by generating the intermediate voltage Vm, thereby substantially preventing the device from being increased in size. Since the vehicle power supply device 1 generates the intermediate voltage Vm, the constant-voltage DC/DC converter 60 does not need special specifications for high voltage, and increase in manufacturing cost of the constant-voltage DC/DC converter 60 can be prevented substantially.

The vehicle power supply device 1 enables the transformer 51c of the bidirectional DC/DC converter 51B to have a single function because no transformer is newly added unlike the conventional technique. Design is therefore easy to be optimized, and the device can be substantially prevented from being increased in size. The vehicle power supply device 1 performs voltage adjustment with the intermediate voltage Vm and steps down the intermediate voltage Vm at the constant step-down ratio, so that design of the constant-voltage DC/DC converter 60 can be optimized using the coupling inductor 63. The vehicle power supply device 1 can thereby substantially prevent the constant-voltage DC/DC converter 60 from being increased in size and substantially prevent noise of the constant-voltage DC/DC converter 60 from being generated.

In the above-mentioned vehicle power supply device 1, the AC/DC converter 51 includes the rectifying circuit 51A rectifying the alternating-current power supplied from the AC power supply 2 into the direct-current power and the bidirectional DC/DC converter 51B boosting the voltage of the direct-current power rectified by the rectifying circuit 51A. The step-down DC/DC converter 52 generates the intermediate voltage Vm provided by stepping down the voltage of the direct-current power supplied from the high-voltage battery 30 using the bidirectional DC/DC converter 51B. With this configuration, the vehicle power supply device 1 can use the bidirectional DC/DC converter 51B both as the boosting converter in charging and as the step-down converter in discharging. The device can therefore be substantially prevented from being increased in size. The vehicle power supply device 1 can ensure insulation of the high-voltage power supply system such as the high-voltage battery 30 and the low-voltage power supply system such as the low-voltage load unit 4 using the transformer 51c of the bidirectional DC/DC converter 51B. The vehicle power supply device 1 can ensure insulation of the AC power supply 2 and the low-voltage power supply system such as the low-voltage load unit 4 by the changeover switch 80.

In the above-mentioned vehicle power supply device 1, the constant-voltage DC/DC converter 60 includes the step-down chopper circuit CP1 having the switching elements 61 allowing conduction of a current or blocking the current and the coupling inductor 63 outputting induction currents in accordance with the operations of the switching elements 61. With this configuration, the vehicle power supply device 1 can optimize the design of the constant-voltage DC/DC converter 60 using the coupling inductor 63 and reduce the noise and size of the constant-voltage DC/DC converter 60.

Modifications

Figure 5:
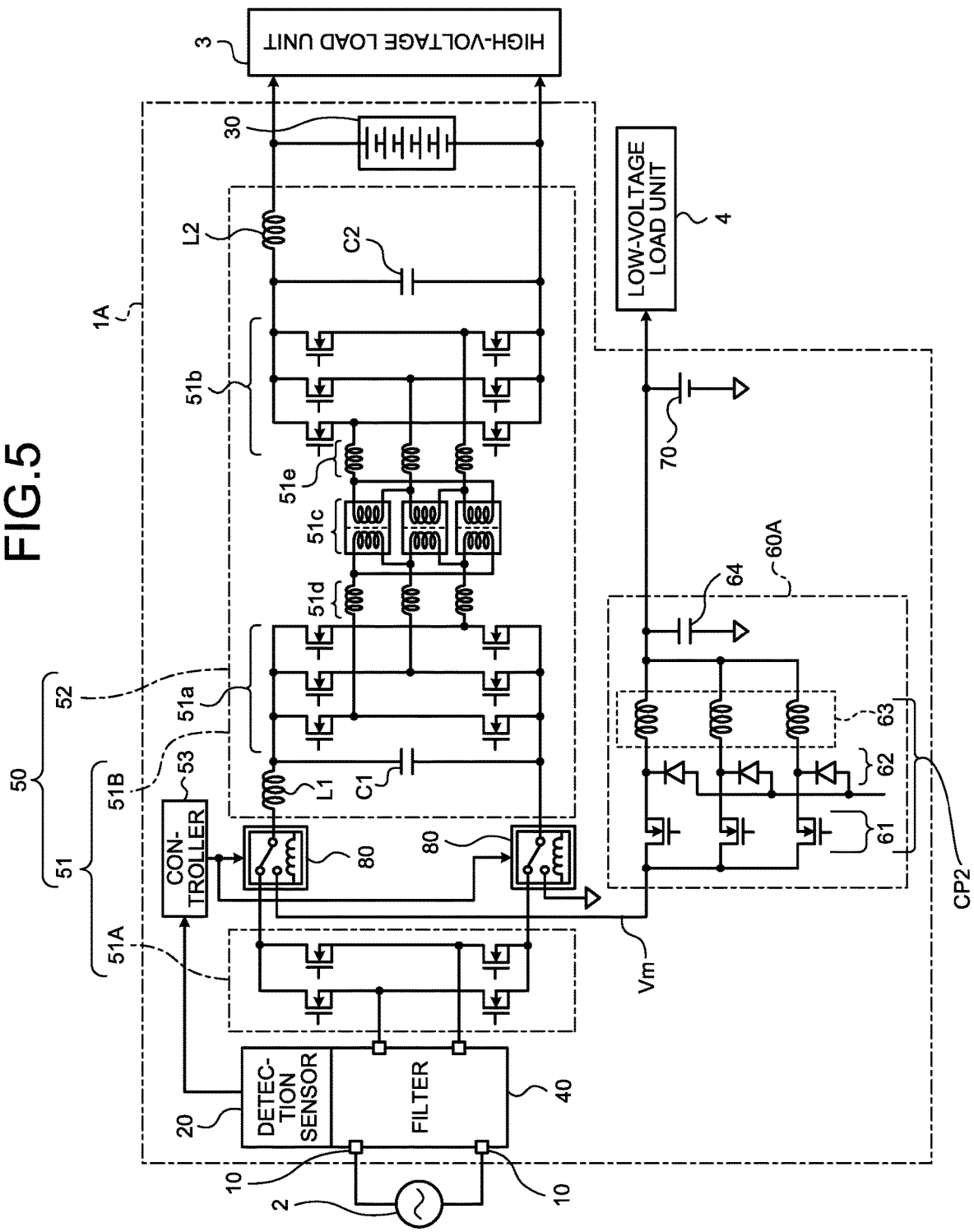
FIG. 5 is a block diagram illustrating an example of the configuration of a vehicle power supply device according to a first modification of the embodiment.

Next, modifications of the embodiment will be described. In the modifications, the same reference numerals denote components equivalent to those in the embodiment and detailed description thereof is omitted. FIG. 5 is a block diagram illustrating an example of the configuration of a vehicle power supply device 1A according to a first modification of the embodiment. The vehicle power supply device 1A in the first modification differs from the vehicle power supply device 1 in the embodiment in the point that a constant-voltage DC/DC converter 60A includes a three-phase step-down chopper circuit CP2. The three-phase step-down chopper circuit CP2 includes three switching elements 61 allowing conduction of a current or blocking the current, three diodes 62, and a coupling inductor 63 formed by three coils outputting induction currents through the diodes 62 in accordance with operations of the switching elements 61, as illustrated in FIG. 5. The constant-voltage DC/DC converter 60A steps down the intermediate voltage Vm at a step-down ratio of ⅓ in the three-phase step-down chopper circuit CP2. When, for example, a maximum value of a voltage of the low-voltage load unit 4 is 15 V and the number of phases is three, a maximum value of the intermediate voltage Vm is 45 V and is lower than the intermediate voltage Vm (60 V) in the case of the four-phase step-down chopper circuit CP1. The three-phase step-down chopper circuit CP2 thereby enables easier voltage handling than the four-phase step-down chopper circuit CP2 but is inferior to the four-phase step-down chopper circuit CP2 in terms of power loss.

Figure 6:
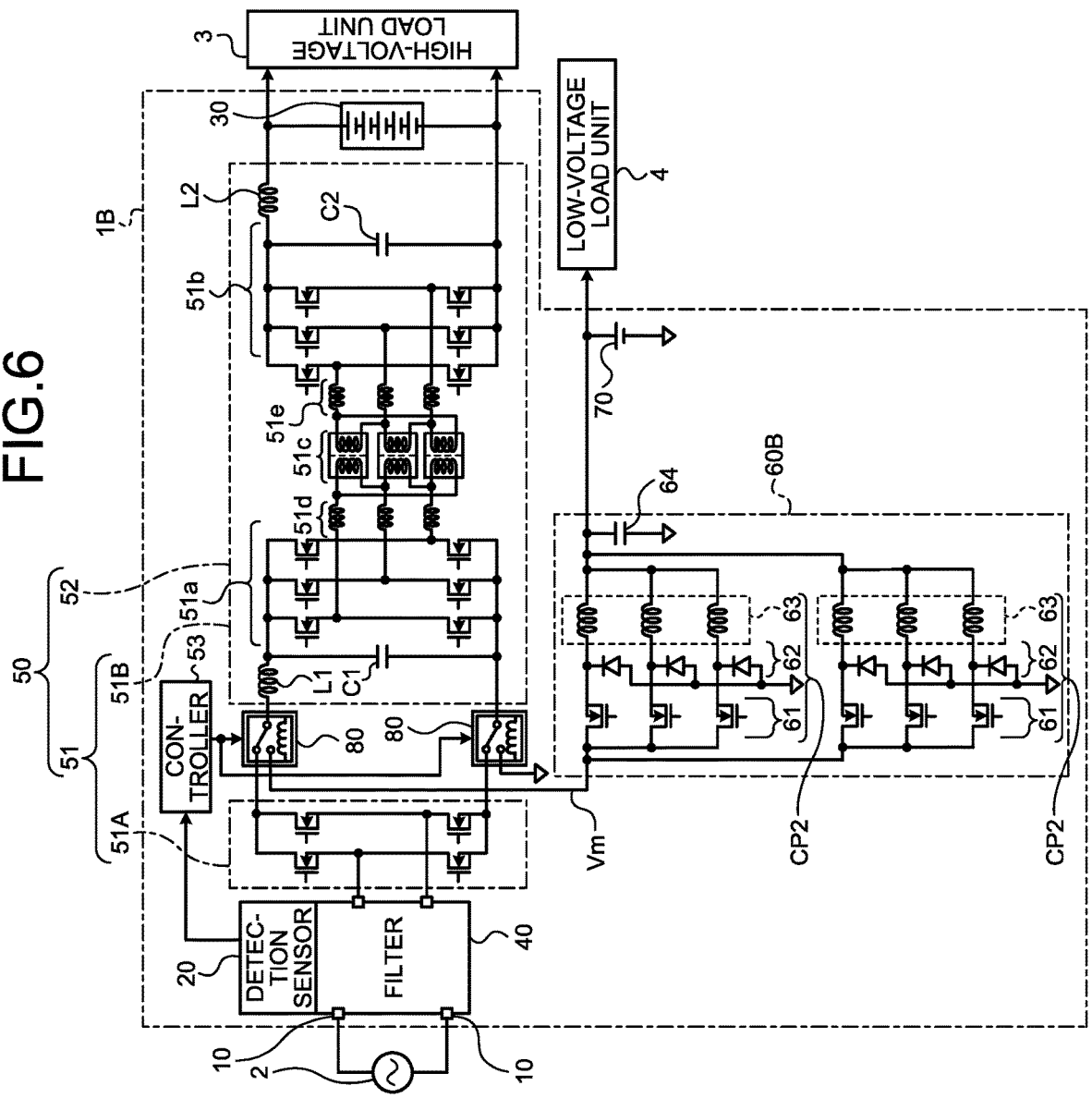
FIG. 6 is a block diagram illustrating an example of the configuration of a vehicle power supply device according to a second modification of the embodiment.

The constant-voltage DC/DC converter 60A may be configured by connecting the step-down chopper circuits CP2 in parallel. FIG. 6 is a block diagram illustrating an example of the configuration of a vehicle power supply device 1B according to a second modification of the embodiment. In the vehicle power supply device 1B in the second modification, a constant-voltage DC/DC converter 60B is configured by, for example, connecting the two three-phase step-down chopper circuits CP2 in parallel, as illustrated in FIG. 6.

Figure 7:
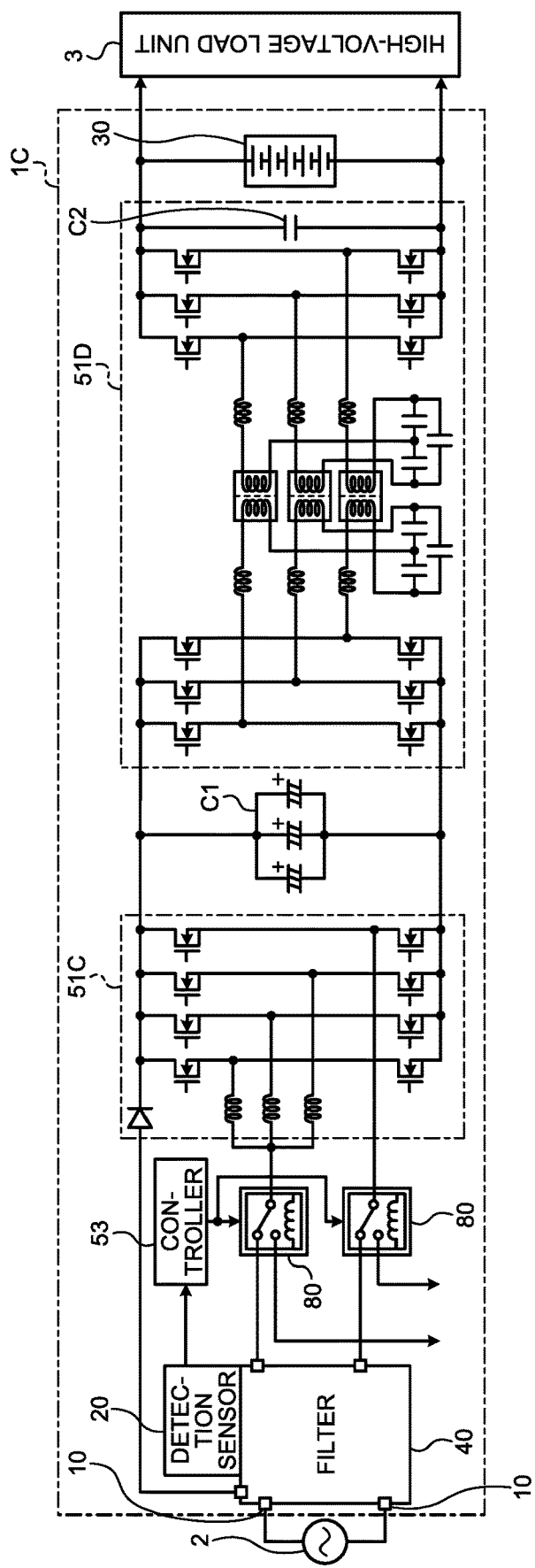
FIG. 7 is a block diagram illustrating an example of the configuration of a vehicle power supply device according to a third modification of the embodiment.

The vehicle power supply device 1 may include a power factor correction (PFC) circuit improving a power factor. FIG. 7 is a block diagram illustrating an example of the configuration of a vehicle power supply device 1C according to a third modification of the embodiment. The vehicle power supply device 1C includes, for example, a PFC circuit 51C connected to the AC power supply 2 with the change-over switch 80 interposed therebetween and a bidirectional DC/DC converter 51D connected to the PFC circuit 51C, as illustrated in FIG. 7.

Although the high-voltage load unit 3 includes the inverter and the motor generator, as an example, it is not limited thereto and may include other electronic devices.

Although the low-voltage load unit 4 includes the auxiliary load unit, as an example, it is not limited thereto and may include other electronic devices.

Although the controller 53 is provided in the power conversion unit 50, as an example, it is not limited to be provided in this manner and may be provided at another place.

The vehicle power supply device according to the present embodiment can use the power converter both as the converter in charging and as the converter in discharging and step down the intermediate voltage at a constant step-down ratio. The device can therefore be substantially prevented from being increased in size.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle power supply device comprising: a battery that supplies direct-current power to a high-voltage load unit and a low-voltage load unit having a lower voltage than a voltage of the high-voltage load unit; a power supply connector that is connected to an alternating-current power supply unit supplying alternating-current power; a power converter that includes an AC/DC converter converting the alternating-current power supplied from the alternating-current power supply unit into the direct-current power to charge the battery with the direct-current power and a step-down DC/DC converter generating an intermediate voltage provided by stepping down a voltage of the direct-current power supplied from the battery; a constant-voltage DC/DC converter that outputs, to the low-voltage load unit, a direct-current power provided by stepping down the intermediate voltage generated by the step-down DC/DC converter; a switching unit that turns ON or OFF electric connection between the AC/DC converter and the power supply connector and turns ON or OFF electric connection between the step-down DC/DC converter and the constant-voltage DC/DC converter; a detector that detects start of supply of the alternating-current power supplied from the alternating-current power supply unit; and a controller that controls the switching unit based on a detection result obtained by the detector, wherein when the detector detects the start of the supply of the alternating-current power, the controller turns ON the connection between the AC/DC converter and the power supply connector to charge the battery with the direct-current power converted by the AC/DC converter and turns OFF the connection between the step-down DC/DC converter and the constant-voltage DC/DC converter to stop a direct-current power output to the constant-voltage DC/DC converter from the step-down DC/DC converter; when the detector does not detect the start of the supply of the alternating-current power, the controller turns ON the connection between the step-down DC/DC converter and the constant-voltage DC/DC converter to output, to the low-voltage load unit, the direct-current power stepped down by the step-down DC/DC converter and the constant-voltage DC/DC converter, the controller is capable of supplying the direct-current power to the high-voltage load unit from the battery without passing through the step-down DC/DC converter, and the controller turns OFF the connection between the AC/DC converter and the power supply connector so as not to charge the battery with the direct-current power from the AC/DC converter, and the constant-voltage DC/DC converter outputs, to the low-voltage load unit, the direct-current power provided by stepping down the intermediate voltage of the direct-current power output from the step-down DC/DC converter at a constant step-down ratio, wherein the switching unit is interposed between a bidirectional DC/DC converter and the constant-voltage DC/DC converter.

2. The vehicle power supply device according to claim 1, wherein
the AC/DC converter includes a rectifying circuit rectifying the alternating-current power supplied from the alternating-current power supply unit into the direct-current power and the bidirectional DC/DC converter boosting a voltage of the direct-current power rectified by the rectifying circuit, and
the step-down DC/DC converter generates the intermediate voltage provided by stepping down the voltage of the direct-current power supplied from the battery using the bidirectional DC/DC converter.

3. The vehicle power supply device according to claim 1, wherein
the constant-voltage DC/DC converter includes a step-down chopper circuit having a switching element allowing conduction of a current or blocking the current and a coil outputting an induction current in accordance with an operation of the switching element.

4. The vehicle power supply device according to claim 2, wherein
the constant-voltage DC/DC converter includes a step-down chopper circuit having a switching element allowing conduction of a current or blocking the current and a coil outputting an induction current in accordance with an operation of the switching element.

5. The vehicle power supply device according to claim 1, wherein
the switching unit comprises only one changeover switch.

6. The vehicle power supply device according to claim 2, wherein
the switching unit is interposed between the bidirectional DC/DC converter and the rectifying circuit.

7. The vehicle power supply device according to claim 2, wherein
the switching unit is interposed both between the bidirectional DC/DC converter and the rectifying circuit and between the bidirectional DC/DC converter and the constant-voltage DC/DC converter.

8. The vehicle power supply device according to claim 5, wherein
the switching unit is interposed both between the bidirectional DC/DC converter and the rectifying circuit and between the bidirectional DC/DC converter and the constant-voltage DC/DC converter.

* * * * *